Patented Sept. 8, 1936

2,053,277

UNITED STATES PATENT OFFICE 2,053,277

MANUFACTURE AND USE OF DYESTUFFS

George Holland Ellis and Frank Brown, Spondon, near Derby, England, assignors to Celanese Corporation of America, a corporation of Delaware No Drawing. Original application February 7, 1933, Serial No. 655,614. Divided and this application December 22, 1934, Serial No. 758,735. In Great Britain February 17, 1932

13 Claims. (Cl. 8—5)

This invention is a divisional of U. S. application Ser. No. 655,614 filed 7th February, 1933, and relates to the colouration of cellulose ester and ether materials.

The amino and simple alkylamino derivatives of anthraquinone, for example 1:4-dimethylamino anthraquinone, are of value for the colouration of cellulose ester and ether materials in that by their aid it is possible to secure, by direct dyeing methods, shades of blue difficult to secure by means of other dyestuffs. Many of these dyeings, however, while reasonably fast to most of the agencies which textile materials are commonly required to withstand, suffer from a lack of resistance to the combined action of light and acid, for instance combustion products of coal gas. This lack of resistance is particularly objectionable in that in general it involves a considerable change in shade towards red and not merely a reduction in the intensity of the dyeing. It may be said that in this respect no really satisfactory direct blue dyestuff for cellulose ester and ether materials is as yet available. Thus, many arylamino anthraquinones, though offering very considerable resistance to the action of acid fumes in the presence of light, have such low affinity for the material as to render them commercially valueless except possibly for the production of pale shades. 1-oxy-4-phenylamino anthraquinone for instance, is extremely resistant to acid fading, but is very red in shade and at the same time is lacking in affinity.

We have now found that derivatives of anthraquinone containing in one α-position a hydroxyl group, in a second α-position an amino or non-aromatically substituted amino group and in a third α-position an arylamino group, these substituents being the sole substituents in the anthraquinone nucleus, constitute very valuable colouring matters for cellulose ester and ether materials, and the present invention consists in the colouration of cellulose acetate or other organic derivative of cellulose with these anthraquinone derivatives.

The dyestuffs employed for the colouration of organic derivatives of cellulose in accordance with the present invention may be represented by the following formula:—

wherein the anthraquinone nucleus A has as sole substituents, in three α-positions the groups X, Y and Z, of which X represents a hydroxyl group, Y an aryl substituted amino group, and Z a free amino group or a non-aromatically substituted amino group, i. e. an amino group substituted only by aliphatic or other residues such that carbon of an aromatic nucleus if present therein is not directly attached to the amino nitrogen. By means of dyestuffs of this series, more particularly by dyestuffs of the above formula in which the arylamino group is in a para-position to either the hydroxyl group or the other amino group, especially the latter, blue shades of exceptional resistance to the usual agencies may be obtained. For example 1-amino-4-phenylamino-5-hydroxy anthraquinone dyes cellulose acetate material in pure blue shades of excellent fastness both to light and to light in the presence of acid fumes such as combustion products of coal gas. Coupled with these valuable properties the dyestuff displays very good affinity for the material. By shading with small quantities of red and yellow dyestuffs very desirable navy blue shades may be obtained.

The aryl substituent of the arylamino group may be of any desired character, for example of the benzene, naphthalene or other series, but is preferably of the benzene series. It may be substituted in any desired manner. Thus, for example, it may contain alkyl, hydroxy, alkoxy, amino, halogen or other substituents. Special reference may be made to the presence of acidyl-amino groups, which may increase the affinity of the dyestuff for the material as described in U. S. application Ser. No. 655,617 filed 7th February, 1933. Again, increased affinity may be imparted by the presence of an alkyl group or other substituent in the meta-position to the amino group, as described in U. S. application Ser. No. 665,513 filed 7th February, 1933, and alkyloxy groups especially in the ortho-position to the amino group may be present, whereby a still further increase of resistance to acid fading may be secured (see U. S. application Ser. No. 655,616 filed 7th February, 1933). The second hydrogen atom of the aryl substituted amino group may also be substituted, for example by means of an alkyl or other aliphatic residue. When present, substituents of the non-aromatically substituted amino group of the anthraquinone derivatives may be of any desired character provided that the amino nitrogen is not directly attached to carbon of an aromatic nucleus of the substituent. As examples of suitable substituents mention may be made of methyl or ethyl or other alkyl groups, substituted alkyl groups, for example hydroxy-ethyl, hydroxy-propyl or γ-chlor-β-hydroxypropyl, aliphatic acidyl groups for example acetyl, hydrogenized aromatic residues for example cyclo-hexyl or substituted cyclo-hexyl groups, and aralkyl groups or hydrogenized aralkyl groups for example benzyl or hydrogenized benzyl residues. If desired the substituent may be united at two points to the amino nitrogen so as to form a heterocyclic residue, as an example of which may be mentioned the piperidyl group. All of the above substituents are in effect aliphatic in character and are so referred to in the appended claims. Two separate substituents may be present in the amino group in question, if desired. Most satisfactory results have been obtained when the amino group is either unsubstituted or substituted only by methyl, ethyl or other aliphatic residue of relatively low molecular weight. The dyestuffs applied to the materials are preferably unsulphonated.

The colouring matters may be applied to textile materials in solution where sufficiently soluble, in aqueous suspension, or after being brought into colloidal form.

For convenience in application, the new colouring matters may be converted into concentrated or other preparations, whether liquid or solid or semi-solid, in which the colouring matters are present in colloidal, dispersed, or other finely divided conditions. Such preparations are included within the scope of the invention and may be prepared for example, by grinding (e. g. in colloid mills), by dissolving in a solvent and mixing with water containing or not containing protective colloids and/or dispersators, or by treatment with dispersing agents whether alone or in the presence of protective colloids and/or liquids, e. g. water.

As examples of dispersing agents or protective colloids mention may be made of the following:—

Sulphoaromatic fatty acid compounds, e. g. sulpho-benzene palmitic acid compounds (see U. S. Patent No. 1,694,413).

Sulphoaromatic ricinoleic acid compounds, e. g. sulpho-naphthalene-ricinoleic acid, (see U. S. Patent No. 1,840,572).

Naphthenic acids or other carbocylic compounds containing salt-forming groups or salts of such acids or compounds (see U. S. Patent No. 1,618,414).

Sulphonated oil compounds, e. g. sulphonated castor oil.

Sulphuric esters of higher aliphatic alcohols.

Furfural-naphthalene sulphonic acid compounds (see U. S. Patent No. 1,928,647).

Resino-naphthalene sulphonic acid compounds (see U. S. Patent No. 1,959,352).

Formaldehyde naphthalene sulphonic acid compounds.

Alkyl-, cycloalkyl-, and aralkyl-naphthalene sulphonic acids.

Sulphite cellulose waste liquor or its constituents or products of transformation, e. g. lignin sulphonic acid compounds.

Sulphonic acid compounds of mineral oils, tar oils, brown coal tar oils, and the like, and their products of condensation with alcohols.

Sulphonic acid compounds of distillation residues of benzaldehyde.

Carbohydrates including gums.

Glue and gelatine.

By addition of or dilution with water, the aforesaid preparations containing unsulphonated colouring matters yield aqueous suspensions or colloidal solutions which may be directly employed for the colouration of cellulose acetate or other organic substitution derivatives of cellulose.

The colouring matters may be applied to the materials in any desired manner, for example by dyeing or other method of uniform application, or by printing, stenciling or other method of local application. For printing cellulose acetate goods the dyestuff may be applied in conjunction with thickening agents or with swelling agents for the cellulose acetate, e. g. methylated spirits. If desired the new colouring matters may be employed for the colouration of stannous chloride discharges in the manner described in U. S. Patent No. 1,949,413.

As examples of cellulose esters and ethers which may be coloured in accordance with the present invention reference may be made to cellulose acetate, formate, propionate or butyrate or the products obtainable by treating alkalized cellulose with esterifying agents, or the ethyl, benzyl or other ethers of cellulose. The dyestuffs may also be applied to mixed materials comprising one or more of the aforesaid cellulose esters or ethers in admixture with other textile fibres, for example wool, silk or other animal fibres, or cotton, regenerated cellulose or other cellulosic materials. Such other fibres may be coloured by the same dyestuffs as the cellulose esters or ethers when they possess the requisite affinity, or they may be coloured either in the same or different shades by means of other dyestuffs, either before, after or simultaneously with the colouration of the cellulose esters or ethers.

The invention is illustrated but not limited by the following example:—

*Example*

To dye 10 kilograms of cellulose acetate knit fabric a blue shade:—

1 kilogram of a paste consisting of one part of finely divided 1-amino-4-anilido-5-oxy-anthraquinone, 6 parts of water and 3 parts of Turkey red oil (50%) is heated to the boil with 10 litres of 2.5 g. p. l. soap solution with stirring, and strained through a filter cloth into a dye-bath containing 300 litres of 2.5 g. p. l. soap solution. The previously scoured cellulose acetate fabric is now entered in rope form, and dyeing commenced cold or luke warm, the temperature being raised slowly to 80° C. and maintained thereat for 1½ hours or till the requisite shade is achieved. The goods are now washed off thoroughly and dried or otherwise treated as desired or requisite.

For printing cellulose acetate goods the dyestuff paste is suitably diluted and thickened with a gum thickening paste which may also contain swelling agents for the cellulose acetate, e. g. methylated spirits. Printing, drying, steaming, etc. may then be effected according to known technique.

What we claim and desire to secure by Letters Patent is:—

1. Process for the colouration of materials comprising an organic derivative of cellulose, which comprises applying thereto an anthraquinone compound of the general formula:—

wherein the anthraquinone nucleus A has, as sole substituents, in three α-positions the groups X, Y and Z, of which X represents a hydroxyl group, Y an arylamino group and Z a group selected from the class consisting of free amino groups and aliphatically substituted amino groups.

2. Process for the colouration of cellulose acetate, which comprises applying thereto an anthraquinone compound of the general formula:—

wherein the anthraquinone nucleus A has, as sole substituents, in three α-positions the groups X, Y and Z, of which X represents a hydroxyl group, Y an arylamino group and Z a group selected from the class consisting of free amino groups and aliphatically substituted amino groups.

3. Process for the colouration of materials comprising organic derivatives of cellulose, which comprises applying thereto a 1-amino-4-arylamino-5-hydroxy-anthraquinone.

4. Process for the colouration of cellulose acetate, which comprises applying thereto a 1-amino-4-arylamino-5-hydroxy-anthraquinone.

5. Process for the colouration of materials comprising organic derivatives of cellulose, which comprises applying thereto a 1-alkylamino-4-arylamino-5-hydroxy-anthraquinone.

6. Process for the colouration of cellulose acetate, which comprises applying thereto a 1-alkylamino-4-arylamino-5-hydroxy-anthraquinone.

7. Process for the colouration of cellulose acetate, which comprises applying thereto a 1-amino-4-phenyl-amino-5-hydroxy-anthraquinone.

8. An organic derivative of cellulose coloured with an anthraquinone compound of the general formula:—

wherein the anthraquinone nucleus A has, as sole substituents, in three α-positions the groups X, Y and Z, of which X represents a hydroxyl group, Y an arylamino group and Z a group selected from the class consisting of free amino groups and aliphatically substituted amino groups.

9. An organic derivative of cellulose coloured with a 1-amino-5-hydroxy-anthraquinone substituted in the 4-position by an arylamino group of the benzene series.

10. An organic derivative of cellulose coloured with 1-amino-4-phenylamino-5-hydroxy-anthraquinone.

11. Cellulose acetate coloured with a 1-amino-5-hydroxy-anthraquinone, substituted in the 4-position by an arylamino group of the benzene series.

12. Cellulose acetate coloured with 1-amino-4-phenylamino-5-hydroxy-anthraquinone.

13. Cellulose acetate coloured with a 1-aliphatically substituted-amino-5-hydroxy-anthraquinone substituted in the 4-position by an arylamino group of the benzene series.

GEORGE HOLLAND ELLIS.
FRANK BROWN.